Figure 1:
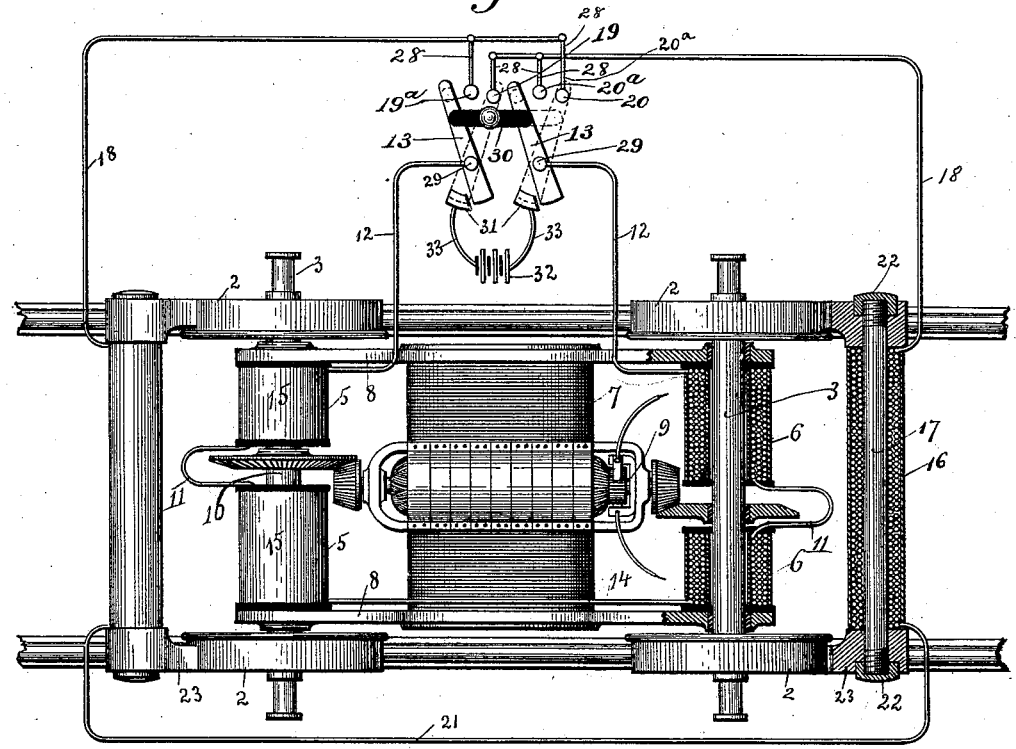

(No Model.)

E. E. RIES.
COMBINED ELECTRO MAGNETIC BRAKE AND TRACTION INCREASING DEVICE.

No. 414,996. Patented Nov. 12, 1889.

ATTEST:
Percy C. Bowen
Joseph Becker

INVENTOR:
Elias E. Ries;
By Harding & Tichenor
his Attorneys.

UNITED STATES PATENT OFFICE.

ELIAS E. RIES, OF BALTIMORE, MARYLAND, ASSIGNOR, BY DIRECT AND MESNE ASSIGNMENTS, TO RIES & HENDERSON, OF SAME PLACE.

COMBINED ELECTRO-MAGNETIC BRAKE AND TRACTION-INCREASING DEVICE.

SPECIFICATION forming part of Letters Patent No. 414,996, dated November 12, 1889.

Application filed December 28, 1887. Serial No. 259,247. (No model.)

*To all whom it may concern:*

Be it known that I, ELIAS E. RIES, a citizen of the United States, residing at Baltimore, in the State of Maryland, have invented certain new and useful Improvements in a Combined Electro-Magnetic Brake and Traction-Increasing Device; and I do hereby declare the following to be a full, clear, and exact description of the invention, such as will enable others skilled in the art to which it appertains to make and use the same.

My invention relates to an improved electro-magnetic brake for the driving-wheels of a railway vehicle or train, and is designed for use in conjunction with my electro-magnetic traction-increasing system for railways, in which system the wheels of the cars are periodically made electro-magnets for increasing the frictional tenacity or bearing of said wheels upon the supporting track-rails.

The particular object of this invention is to facilitate the application and withdrawal of the brakes by utilizing the attraction and repulsion of a brake-shoe with its respective driving-wheel, due to the establishment of like and opposite magnetic polarities between the same by changing the direction of the flow of the electric currents passing over a circuit including magnetizing-coils of both the brake-shoes and the driving-wheels, thereby variably increasing the magnetic force of attraction or repulsion between any wheel and brake-shoe by producing like or opposite polarities between the same according to requirements.

My invention has for its further object to provide adequate means whereby, upon application of the brakes, a traveling car or vehicle may be slowed up and entirely stopped within a very short distance and space of time.

A further object of my invention is to dispense with the employment of manual brake-levers and cumbersome brake-shifting mechanism, and to increase the ease and efficiency of operation by controlling the action of the brake entirely by the manipulation of a circuit-changing switch located within convenient reach of the operator upon the vehicle or train.

For the attainment of these several objects my invention consists, essentially, in establishing two independent self-contained electric circuits, traveling with the vehicle or train, approximately of equal resistance and fed by a single source of electricity, one of said circuits including magnetizing-coils so arranged in inductive proximity to each pair of brake-shoes as to produce magnetism of opposite polarity, respectively, therein by a passage of currents of electricity therethrough, and the other electric circuit including magnetizing-coils so arranged in inductive proximity to each axle of the vehicle carrying a pair of wheels that a closed magnetic circuit is completed through the axles, wheels, and intervening track-rails, and the successive wheels of said vehicle are converted into poles of opposite polarity.

My invention consists, further, in a manual switch controlling the path of the currents, preferably from the single source of electricity into the two independent circuits, whereby the direction of the currents traversing the respective circuits may be changed at will, and consequently the relative polarities of a brake-shoe and wheel may be made like or dissimilar according to the occasion or demands of the moment.

My invention consists, further, in utilizing the magnetic force of attraction between the driving wheels and rails produced by the magnetizing influence of the traction-circuit for increasing the retardation of the train on downgrades when slowing down or coming to a stop—that is to say, the traction of the wheels upon the rails produced by my improved traction-increasing system is designed to be utilized in conjunction with my electro-magnetic brakes solely for assisting the braking agency thereof, as will appear hereinafter.

My invention consists, further, in certain details of construction, combination, and arrangement of parts and connections, all of which will be more fully described hereinafter, and the specific points of novelty in which will be designated in the appended claims.

Figure 2:
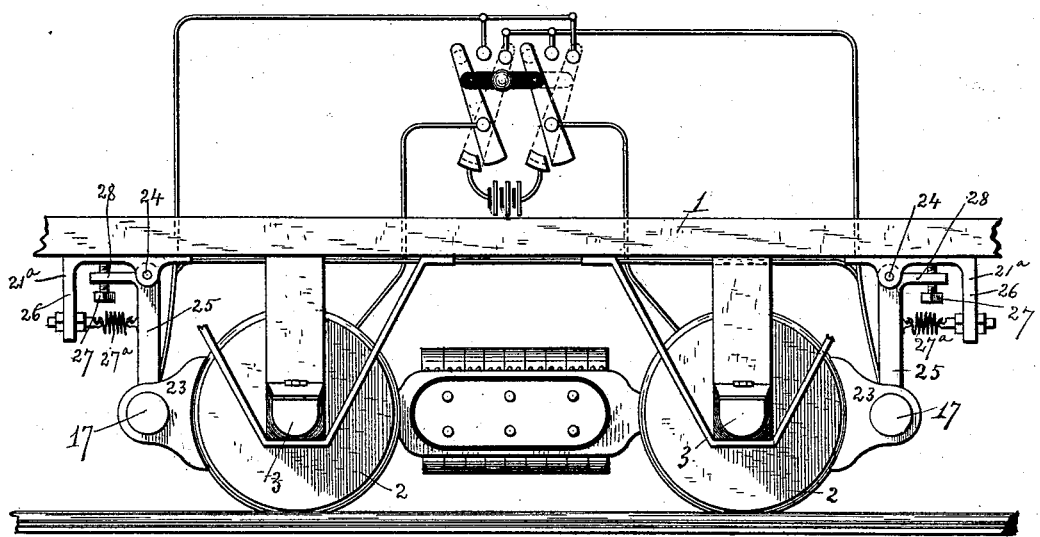

Referring to the accompanying drawings, which form a part of this specification, Figure 1 is a plan view, partly in section and partly in diagram, of a railway-car truck equipped with my invention and showing conventionally the exciting source of electricity, the circuits, and electrical connections. Fig. 2 is a view in side elevation, partly in diagram, of Fig. 1.

Like numbers of reference indicate like or corresponding parts in both views.

As shown in both figures of the drawings, the car is propelled by an electric motor of any approved type, which may derive its actuating-current from any convenient or available source, which may be from overhead or underground line conductors, or from a storage system carried upon the vehicle.

1 indicates the car-truck, consisting of the flange-wheels 2 2 and the axles 3 3.

The motor 7 is centrally supported between the front and rear axles of the car by the motor side bars 8 8, and has its armature-shaft 9 geared at each end to the center of its respective axle 3. In order that the armature-shaft may be thus mechanically connected to each axle 3 3, it will be obvious that the magnetizing-coils 5 6, which are wound, respectively, around the axles 3 3, are centrally divided at the motor-gearing point 10, and each division of a coil 5 or 6 is electrically connected by the loop 11. It will be entirely apparent that these coils 5 and 6 may be arranged stationary and independent of their respective axles, or may be constructed to revolve with said axles, as may be desired, without departing from the spirit of my invention. However, in the drawings (see Figs. 1 and 2) the helices 5 and 6 are shown mounted rigidly over the driving-axles 3 3, the latter being free to revolve. One terminal of each coil 5 or 6 is connected by the conductor 12 with one of the switch-levers 13, and the other respective terminals of the coils 5 and 6 are mutually in electrical connection by the conductor 14. Thus it will be seen that there is a closed metallic circuit in series from one switch-lever 13 to the other through the respective helices 5 and 6.

When the magnetizing-coils are placed upon the axles of a vehicle propelled by an agency other than an electric motor, or when the motor used is not geared in the manner shown to the axles, it will be apparent that an uninterrupted coil may envelop the entire length of the axle without being divided into two parts, as herewith shown. The two coils 5 and 6 are insulated at each extremity from the adjacent parts of the truck, and are preferably protected by a concentric shield or wrapping 15, as shown clearly in Fig. 1, and the four wheels 2 2 of the vehicle are each magnetically in contact with its respective axle, thus forming a closed magnetic circuit through the two axles, their attached wheels, and the intervening track, whether or not the vehicle is stationary or in motion.

16 16 respectively designate the magnetizing-coils for the brake-shoes 23 23, wound around the brake-cores 17 17 and each having one terminal connected electrically by a conductor 18 with the switch-contacts 19ᵃ 19 or 20ᵃ 20, as the case may be, while the two remaining terminals of both coils 16 16 are electrically in circuit with each other by the conductor 21 or its equivalent. The coils 16 16 are so wound as to be approximately of equal resistance to the magnetizing-coils 5 and 6, and are respectively insulated from the brake-shoes 23 and cores 17, and, similar to the coils 5 and 6, are provided with concentric protecting-shields of insulation 15. (See Fig. 1.)

At each extremity of a core 17 is a brake-shoe 23, forming an enlarged pole-piece of said core and rigidly secured thereupon magnetically in contact with said core in any suitable manner, as shown.

22 22 designate securing-nuts placed on the screw-threaded ends of each core to prevent any lateral displacement or loosening of the brake-shoes.

Referring to Fig. 2, the brake-shoes 23 23 are supported in proper relative position with their respective driving-wheels by the depending pivoted plates 25 25, which are each secured at their lower extremities to the cores 17, and at their upper ends are pivoted to the brackets 21ᵃ by the pivot-pins 24.

28 indicates a horizontal plate formed integral with the vertical plate 25 and provided with a screw-threaded perforation, in which is placed the correspondingly screw-threaded limiting-pin 27, whose upper extremity rests normally against the bracket 21ᵃ.

26 is a depending arm formed integral with the bracket 21ᵃ and serves to support the adjusting device of the retractile spring 27ᵃ, attached, respectively, to a plate 25 and an adjusting device.

Each brake-shoe 23 is formed of a large mass of magnetic metal and may be made in any approved shape or manner, and is provided upon its face with a concave arc-shaped recess, conforming in contour with and depth to the convex periphery of the respective driving-wheel.

From the foregoing description it will be understood that each core 17 carries a pair of brake-shoes, which latter are moved in unison to or from their respective wheels, in a manner hereinafter explained. The two conductors 18 18 terminate, respectively, in two sets of switch-contacts 19ᵃ 19 and 20ᵃ 20, each contact 19 or 20 being connected with its respective conductor 18 by a branch 28, as shown, and the relative arrangement and situation of such contacts is such that when one switch-lever 13 is upon a contact 19ᵃ the other will be upon a contact 20ᵃ, &c., inasmuch as both levers 13 13 are pivotally supported beyond their respective central points by the pivots 29 29, which in turn are severally in electrical contact with the conductors 12 12, leading to the magnetizing-coils 5 and 6.

30 is an insulated pivoted bar, serving to connect the two switch-levers 13 13, so that the latter shall move in unison when adjusted to any desired position.

The source of electricity for the magnetizing-coils 5, 6, and 16 is not connected directly with the switch-levers 13 13 in the usual manner, but on the other hand is in electrical communication with the terminal plates 31 31 by the conductors 33 33, and, as shown clearly in Fig. 1, the rear extremities of said levers 13 13 are normally out of contact with the terminal plates 33 33, so that no current passes through the magnetizing-coils until the switch is manipulated in a manner hereinafter explained. The terminal plates 31 31 are respectively arranged under the rear extremities of said switch-levers and so shaped as to allow the rear extremities of the said levers 13 13 to be in electrical contact therewith only when the latter are upon either the two sets of contacts $19^a$ $20^a$ and 19 20.

33 33 designate the wires connecting the terminal plates 31 31 with the source of electricity 32, which may be either located upon the car or may be situated at a fixed station and collected from line-conductors. Such source has been conventionally shown in the drawings as independent of the motor-circuit, so that the operation of the brakes may be entirely independent from that of the motor.

The operation of my invention is as follows: Should it be desired to apply the brakes for slowing down or stopping a vehicle under headway, the operator simply adjusts the switch-levers 13 13 upon the switch-contacts 19 20, as shown in dotted lines in Figs. 1 and 2, which action will bring the rear extremities of said levers respectively in contact with the terminal plates 31 31 and throwing the current from the source of electricity 32 simultaneously through the magnetizing-coils 5, 6, and 16 over the following path: Assuming that the current flows from the positive pole of the source 32, it will continue over 33 31 13 to the point 29. Now the magnetizing-coils 5 and 6, being equal in resistance to the magnetizing-coils 16, the current will divide at the switch-lever 13 and will pass contemporaneously through both the magnetizing-coils 5 and 6 and 16; or, in other words, will traverse simultaneously the brake and traction circuits. I will first trace the path of the current through the brake-circuit: Continuing from switch-lever 13, it will flow over $20^a$ 28 18 16 21 16 18 28 19 13 31 33 back to the minus pole of the source 32. Thus a closed electric circuit is established through the magnetizing-coils 16 16 of the brake-shoes, thereby producing magnetism in the cores 17 17 and in their respective pole-pieces 23 23. Following the circuits thus established, the first pole induced will be plus and the next minus, then plus, then minus, thereby making each pair of brake-shoes 23 23, which are magnetically attached to and from the pole-pieces of each core 17, of opposite polarity. Next we will trace the traction-circuit, the current dividing at the pivot 29, and then passing over the traction-circuit would traverse 29 12 6 11 6 14 5 11 5 12 29 31 33 back to the minus pole of the source 32. Thus the magnetizing-coils 5 and 6 would be energized at the same time that the coils 16 16 were charged, and successive poles of opposite polarity would be established in the respective driving-wheels 2 2 and a closed magnetic circuit would be formed by the wheels, intervening rails, and axles; but, as will be ascertained by following the circuits traced, the polarity of any one driving-wheel 2 would be unlike that of its respective brake-shoe. Consequently the law of magnetic attraction would force the pivotally-supported brake-shoe in magnetic adhesion against the wheel 2, and the arc-shaped recess of the former would embrace the periphery of the latter and retard the rotation of said wheel, and therefore all of the four brake-shoes are instantaneously attracted and two closed magnetic circuits are established through the respective wheels, brake-shoes, core, and axles. Now it will be apparent that there will be in this event three closed magnetic circuits traveling with the vehicle, and the brake-shoes will retard the rotation of the wheel, while the adhesion of the wheel to the rail will have an auxiliary braking or retarding tendency, thus assisting the operation of the brakes. By this arrangement I am enabled to attain a double-braking effect—viz., one due to the frictional adhesion of the brake-shoes and the other due to the adhesion of the wheels to the supporting-rails. Consequently it will be obvious that by utilizing both of these co-operating features the vehicle can be slowed up and effectually checked at a moment's notice by a mere adjustment of a hand-switch. When necessary to withdraw the brake-shoes and break the circuit, the operator throws the switch in the position shown in full lines, Figs. 1 and 2, thereby placing the rear extremities of the switch-levers out of contact with the terminal plates 31 31, thereby de-energizing the magnetizing-coils of both circuits and cutting off the induced magnetism. Then the retracting agency of the springs $27^a$ will restore the brake-shoes to their normal position, and the limiting-pin 27 will prevent said brake-shoes from being withdrawn out of the influence of the mutual attraction or repulsion between their respective wheels. Now, should it be desired to utilize the traction-increasing equipment without the braking apparatus, the operator throws his switch upon contacts $19^a$ $20^a$, thereby changing the direction of the current through the respective magnetizing-coils and making each wheel and its respective brake-shoe of like polarity, which will obviously tend to repel the brake-shoes and keep them out of contact with the wheels. At the same time the magnetizing-coils 5 and 6 will induce magnetism in the closed magnetic traction-circuit, making the successive wheels and rails of opposite polarity and increasing the frictional adhesion between said wheels and rails. In this instance there will be only one closed magnetic system instead of three, for the reason that the brake-shoes, being out of magnetic contact with the wheels, break the continuity of those magnetic circuits.

With a few cells of secondary battery on each car my invention can be applied to any existing railway, whether self-propelled or not.

The several parts of the apparatus are durable and cheap in first cost and maintenance. Any ordinary railway-car can be equipped with the same with comparatively small cost.

Having thus fully described my invention, what I claim as new, and desire to secure by Letters Patent of the United States, is—

1. In a railway vehicle or train, wheels of magnetizable metal, brake-shoes of magnetizable metal for said wheels, magnetizing-coils respectively in inductive proximity to said wheels and brake-shoes, and a source of electricity for charging said coils, all arranged for the purpose set forth.

2. In a railway vehicle or train, wheels of magnetizable metal, brake-shoes of magnetizable metal for said wheels, magnetizing-coils respectively in inductive proximity to said wheels and brake-shoes, an electric circuit, including said magnetizing-coils, and a circuit-changer for said circuit, all arranged for the purpose set forth.

3. In a railway, a closed magnetic circuit, including wheels of a railway-vehicle and the track-rails extending between the same, magnetizing-coils in inductive proximity to said wheels, brake-shoes for said wheels, magnetizing-coils for said brake-shoes, and a source of electricity for charging said coils, all arranged for the purpose set forth.

4. In a railway, a closed magnetic circuit, including wheels of a railway-vehicle and the sections of track extending between the same, of brake-shoes for said wheels, an electric circuit for establishing said closed magnetic circuit, magnetizing-coils for said brake-shoes, and a source of electricity for charging said coils, all arranged for the purpose set forth.

5. In a railway, a closed magnetic circuit, including wheels of a railway vehicle or train and the sections of track extending between the same, of brake-shoes for said wheels, an electric circuit for establishing said closed magnetic circuit, magnetizing-coils for said brake-shoes, a source of electricity for charging said coils, and a circuit-changer for directing the current from said source, all arranged for the purpose set forth.

6. In a railway, a closed magnetic system, including the wheels of a vehicle or train and the rails extending between the same, said magnetic system having alternating magnetic polarities in the successive wheels of said vehicle, an electric circuit for establishing said alternating magnetic system, brake-shoes for said wheels, and magnetizing-coils in inductive proximity to said brake-shoes and included in said electric circuit, all arranged for the purpose set forth.

7. In a railway, a closed magnetic system, including the wheels of a vehicle and the rails extending between the same, said magnetic system having alternating magnetic polarities in the successive wheels of said vehicle, an electric circuit for establishing said magnetic circuit or system, brake-shoes for said wheels, magnetizing-coils in inductive proximity to said brake-shoes and included in said electric circuit, and a circuit-changer for said circuit, all arranged for the purpose set forth.

8. Two or more magnetizing-coils in inductive proximity to the wheels of a vehicle and in circuit with each other and with a source of electricity, the wheels of said vehicle forming the poles of electro-magnets, brake-shoes for said wheels, magnetizing-coils for said brake-shoes, an electric circuit including said magnetizing-coils, and a circuit-changer for said circuit, all arranged for the purpose set forth.

9. Two or more magnetizing-coils in inductive proximity to the wheels of a vehicle and in circuit with each other and with a suitable source of electricity, the wheels of said vehicle forming the poles of electro-magnets, brake-shoes for said wheels, magnetizing-coils for said brake-shoes, and an electric circuit including said magnetizing-coils, all arranged for the purpose set forth.

10. The combination, with two branch circuits traveling with a railway-vehicle and including magnetizing-coils respectively in inductive proximity to brake-shoes and wheels, of the wheels of said vehicle, brake-shoes for said wheels, a circuit-changer controlling both circuits, and a single source of electricity for charging both circuits.

11. In a railway, the combination, with the axles and wheels of a traveling vehicle and the rails extending between said wheels, of magnetizing-coils in inductive proximity to said axles and wheels, pivotally-supported brake-shoes for said wheels, magnetizing-coils in inductive proximity to said brake-shoes, and an electric circuit including said magnetizing-coils.

12. In a railway, the combination, with the axles and wheels of a traveling vehicle and the rails extending between the same, of magnetizing-coils in inductive proximity to said wheels, pivotally-supported brake-shoes for said wheels, magnetizing-coils in inductive proximity to said brake-shoes, and an electric circuit, respectively, for said magnetizing-coils fed by a single source of electricity.

13. In a railway, the combination, with the axles and wheels of a vehicle and the rails extending between said wheels, of magnetizing-coils in inductive proximity to said wheels, pivotally-supported brake-shoes for said wheels, magnetizing-coils in inductive proximity to said brake-shoes, an electric circuit respectively for said magnetizing-coils, and a circuit-changer for said circuit.

14. The combination, with wheels of a railway vehicle or train, of brake-shoes respectively for said wheels, magnetizing-coils respectively in inductive proximity to said brake-shoes and wheels, a single source of electricity for charging said coils, and means for changing the relative direction of the electric current through said coils.

15. The combination, with wheels of a railway vehicle or train, of magnetizing-coils in inductive proximity to said wheels, brake-shoes for said wheels, magnetizing-coils for said brake-shoes approximately of equal resistance to the magnetizing-coils of the wheels, an electric circuit including said magnetizing-coils, and a circuit-changer for said circuit.

16. The combination, with the wheels of a railway-vehicle, of pivotally-supported brake-shoes respectively therefor, magnetizing-coils in inductive proximity to said brake-shoes, an electric circuit including said coils, and a circuit-controller for said circuit.

17. The combination, with an axle of a railway-vehicle carrying a pair of magnetizable wheels, of a pair of pivoted brake-shoes respectively for said wheels and forming the pole-pieces of an electro-magnet, an electro-magnet having magnetizing-coils concentrically enveloping the core carrying the said brake-shoes, and a circuit and circuit-changer for establishing like and dissimilar polarities between the wheels and brake-shoes, substantially as described.

18. The combination, with a pair of magnetizable wheels and a pair of pivoted brake-shoes therefor, of an inducing electric circuit and circuit-controller for said circuit for establishing magnetic polarities both in the brake-shoes and wheels, substantially as described.

19. The combination, with a closed magnetic system for increasing the traction or adhesion of a wheeled vehicle traveling upon a metallic track, an inducing electric circuit for establishing said magnetic system, and a circuit-controller for said circuit, of electro-magnetic brakes for the said vehicle controlled by the said inducing electric circuit and circuit-controller, whereby both the traction and braking instrumentalities can be utilized for braking the vehicle, substantially as described.

In testimony whereof I affix my signature in presence of two witnesses.

ELIAS E. RIES.

Witnesses:
GEO. H. TICHENOR,
E. L. WHITE.